Patented Aug. 30, 1932

1,875,272

UNITED STATES PATENT OFFICE

WILLIAM SMITH AND ROBERT FRASER THOMSON, OF GRANGEMOUTH, SCOTLAND, ASSIGNORS TO IMPERIAL CHEMICAL INDUSTRIES LIMITED, A CORPORATION OF GREAT BRITAIN

PRODUCTION OF ANTHRACENE DERIVATIVES

No Drawing. Application filed October 20, 1931, Serial No. 570,032, and in Great Britain October 16, 1930.

This invention relates to the production of derivatives of the benzoylbenzoic acid and anthracene series and more particularly of such derivatives containing fluorine.

It is an object of this invention to provide new 2-benzoylbenzoic acids containing fluorine, and new aminoanthraquinones containing fluorine. It is a further object of the invention to devise methods for the manufacture of these new compounds. A further object of the invention is to provide new compounds of the anthraquinone series containing fluorine, which are useful as dyestuffs for cellulose ester and ether materials and also as intermediates for the production of further new compounds including vat dyes.

Aminoanthraquinones containing fluorine are, so far as we are aware, new compounds.

We have found that 4'-fluoro-2-benzoylbenzoic acid is a suitable starting material for the preparation of such compounds. On nitration it yields what appears to be 4'-fluoro-3'-nitro-2-benzoylbenzoic acid, and this product on reduction gives an amine which has probably the structure:

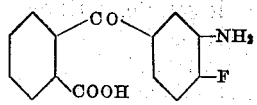

A formula which may be used to represent both the amino- and the nitro-structure is as follows:

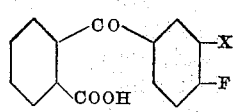

wherein X represents $NH_2$ or $NO_2$.

When this compound is treated wtih cyclizing agents of the sulphuric acid type it is converted into isomeric fluoroaminoanthraquinones which have the probable formulæ

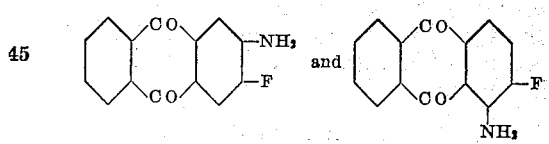

We have further found that when the acid solution of this mixture is diluted the 2:3-isomeride is first precipitated and the 2:1-compound may afterwards be obtained by diluting the filtrate.

In order further to illustrate the invention the following examples, in which parts are parts by weight, are given.

Example 1

200 parts of 4'-fluoro-2-benzoylbenzoic acid are added as quickly as possible to 1000 parts of 97 per cent nitric acid which are kept well stirred below 30° C. When addition is complete, stirring is continued for 5 minutes and the solution then precipitated on ice, allowed to stand for several hours, filtered, washed acid free and dried.

The product obtained in this way appears to be a mono-nitro derivative and is probably 4'-fluoro-3'-nitro-2-benzoyl-benzoic acid.

Example 2

This is another example of the nitration of 4'-fluoro-2-benzoylbenzoic acid.

280 parts of 4'-fluoro-benzoyl-2-benzoic acid are dissolved in 540 parts of 100 per cent sulphuric acid and the solution cooled to 5° C. 432 parts of a mixture of 357 parts of 100 per cent sulphuric acid and 75 parts of 98 per cent nitric acid are then dripped in slowly so that the temperature does not rise above 10° C. After the completion of the addition of the nitrating acid, the solution is stirred for 30 minutes, and then poured on to 3,000 parts of crushed ice. The precipitate is allowed to stand overnight and then filtered off, washed acid free, and the paste taken up with 1000 parts of water and stirred to a thin cream.

Example 3

240 parts of the product obtained according to Example 1 are stirred into 5000 parts of water, the temperature is raised to 75° C. and 60 parts of 80 per cent acetic acid and 440 parts of tin dust added in small quantities at a time during several hours until reduction is complete. Ammonia is then added in slightly larger quantities than necessary to neutralize the solution and the charge filtered. The filtrates are cooled with ice and then carefully neutralized with hydrochloric acid while being well stirred. After standing for a few hours the product is filtered off and dried and appears to consist of substantially pure 4'fluoro-3'amino-2-benzoylbenzoic acid.

Example 4

This is another example of the reduction of the product of nitration of 4'-fluoro-2-benzoylbenzoic acid.

The nitro paste from the preceding Examples 1 or 2 is added over a period of 2 hours to a mixture made up of 3000 parts of water, 36.5 parts of glacial acetic acid and 400 parts of iron dust, the temperature of the mixture being held at 90–95° C. After this addition of the paste, the mixture is stirred a further 30 minutes, and a solution made up of 125 parts of sodium carbonate and 650 parts of water carefully added. The reduction product dissolves and the solution is filtered from iron sludge, cooled by adding cracked ice and then made very weakly acid to Congo red paper with dilute hydrochloric acid. After standing overnight the precipitated reduction product is filtered off and washed free of mineral acid and dried.

Example 5

100 parts of the product of Example 3 or 4 are sprinkled into 600 parts of 100 per cent sulphuric acid. The temperature is raised to about 180° C. and kept at this until ring-closing is complete. The solution is then cooled and sufficient water carefully added to reduce the strength of the acid to 80 per cent $H_2SO_4$. Heating is carried out for about ¼ hour at 80° C. and the mass then cooled to below 20° C. and filtered. The residue on the filter is washed with 80 per cent sulphuric acid until the filtrate is colourless and then with water until acid free. During the washing with water the grey colour of the sulphate changes to the yellowish red of the free amine and after washing hydrolysis is completed by boiling with water and the product filtered off. It is a bright reddish yellow powder of melting point about 280° C. and appears to consist substantially of 2-fluoro-3-amino-anthraquinone.

The filtrates and washings from the 80 per cent sulphuric acid are drowned with water, filtered, washed and dried to give what appears to be impure 2-fluoro-1-amino-anthraquinone. If the cyclization product is drowned with water in the first place, the precipitate is a mixture of the two isomerides.

Example 6

This is a further example describing the ring closure of the reduction product.

107 parts of the reduction product of Examples 3 or 4 are dissolved in 652 parts of sulphuric acid mono-hydrate and the solution warmed to 170–175° C. for 1 hour. After cooling to ordinary temperature the acid strength is reduced to 75 per cent sulphuric acid by the addition of 583 parts of water. A body which appears to be the sulphate of 2-fluoro-3-a m i n o-anhtraquinone separates and is filtered off at room temperature. It is washed with 70 per cent sulphuric acid and then with boiling water till free of sulphuric acid. The body which appears to be 2-fluoro-3-amino-anthraquinone which is obtained can be further purified by dissolving in 6 times its weight of sulphuric acid and then reducing the said strength to 75 per cent sulphuric acid, cooling, filtering off the sulphate and working up in the usual manner.

Example 7

This example describes the use of the 2-fluoro-3-amino-anthraquinone as obtained by the method of the preceding example as a dyestuff for acetyl silk.

10 parts by weight of acetyl silk hank are introduced into a mixture made up of 0.1 part of the dyestuff powder, 200 parts of water and 5 parts of alcohol at 80° C. The hank is worked in the usual manner for 1 hour and is dyed a bright yellow shade.

Other cellulose ether or ester materials may be dyed in a similar manner. The separated 2:1- or 2:3- fluoroamino-anthraquinones or the mixture of both may be employed.

For the nitration of the 4'-fluoro-2-benzoylbenzoic acid any of the usual nitrating agents may be employed, and for the reduction of the nitro compound we may use not only iron and acetic acid but also other metals (e. g. zinc) and other acids (e. g. mineral acids) or we may use ferrous sulphate and ammonia or any other reducing means for the conversion of nitro-halogen derivatives into amino-halogen derivatives.

For the cyclization of the fluoroaminobenzoylbenzoic acid, concenrated sulphuric acid, e. g. 100 per cent strength, is most suitable, but fuming sulphuric acid or chlorosulphonic acid may equally be employed.

In the dilution of the cyclization product to precipitate the products water may be added either as liquid water or as ice or in the form of dilute sulphuric acid.

The mixture of isomeric fluoroaminoanthraquinones may be precipitated without separation if desired by complete dilution.

As many apparently widely different embodiments of this invention may be made without departing from the spirit and scope thereof, it is to be understood that we do not limit ourselves to the specific embodiments thereof except as defined in the appended claims.

We claim:

1. In the process of manufacturing fluorine-containing benzoylbenzoic acids and aminoanthraquinones therefrom, the step which comprises mono-nitrating 4′-fluoro-2-benzoylbenzoic acid in the 3′-position.

2. In the manufacture of fluorine-containing benzoyl-benzoic acids and aminoanthraquinones therefrom, the process which comprises mono-nitrating 4′-fluoro-2-benzoylbenzoic acid in the 3′-position and reducing the resulting nitro compound to an amino compound.

3. In the manufacture of fluorine-containing benzoylbenzoic acids and aminoanthraquinones therefrom, the process which comprises mono-nitrating 4′-fluoro-2-benzoylbenzoic acid in the 3′-position, reducing the resulting nitro compound to an amino compound and effecting ring closure.

4. In the manufacture of fluorine-containing benzoylbenzoic acids and aminoanthraquinones therefrom, the process which comprises mono-nitrating 4′-fluoro-2-benzoylbenzoic acid in the 3′-position, reducing the resulting nitro compound to an amino compound and effecting ring closure by heating said amino compound in concentrated sulfuric acid.

5. In the manufacture of fluorine-containing benzoylbenzoic acids and aminoanthraquinones therefrom, the process which comprises mono-nitrating 4′-fluoro-2-benzoylbenzoic acid in the 3′-position, reducing the resulting nitro compound to an amino compound, cyclizing said amino compound and separating the resulting isomeric amino-anthraquinones by successive dilution.

6. New products suitable for use as dyes and intermediates and having a structure consisting of two benzene radicals joined by at least one —CO— group, one of said radicals being substituted by a fluorine atom in the 4′-position para to the said —CO— group, and in the 3′-position with a substituent selected from a group consisting of —NH$_2$ and —NO$_2$; the second of said benzene radicals being substituted in the 2-position ortho to the —CO— group with a substituent selected from a group consisting of —COOH and —CO—, the second bond of the said —CO— group being then attached to the first benzene radical in the 6′-position.

7. Dye intermediates having the probable formula

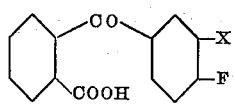

wherein X represents NH$_2$ or NO$_2$.

8. As new products, fluoroaminoanthraquinones selected from a class consisting of the 2:3- and the 2:1- substituted fluoroaminoanthraquinones.

9. As a new product a mixture of 2:3- and 2:1-fluoroaminoanthraquinones resulting from the cyclization of 4-fluoro-3′-amino-2-benzoylbenzoic acid.

10. As a new product, 2:3-fluoroaminoanthraquinone.

11. As a new product, 2:1-fluoroaminoanthraquinone.

In testimony whereof we have affixed our signatures.

WILLIAM SMITH.
ROBERT FRASER THOMSON.